US008410449B2

(12) United States Patent
Thon et al.

(10) Patent No.: US 8,410,449 B2
(45) Date of Patent: Apr. 2, 2013

(54) SILICON PHOTOMULTIPLIER ENERGY RESOLUTION

(75) Inventors: Andreas Thon, Aachen (DE); Thomas Frach, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 561 days.

(21) Appl. No.: 12/675,973

(22) PCT Filed: Aug. 26, 2008

(86) PCT No.: PCT/IB2008/053434
§ 371 (c)(1),
(2), (4) Date: Mar. 2, 2010

(87) PCT Pub. No.: WO2009/031074
PCT Pub. Date: Mar. 12, 2009

(65) Prior Publication Data
US 2010/0200763 A1 Aug. 12, 2010

Related U.S. Application Data

(60) Provisional application No. 60/969,709, filed on Sep. 4, 2007.

(51) Int. Cl.
*G01T 1/24* (2006.01)

(52) U.S. Cl. .................................. 250/370.11; 250/368

(58) Field of Classification Search .................. 250/368
See application file for complete search history.

(56) References Cited

U.S. PATENT DOCUMENTS 4,033,697 A * 7/1977 Pfoutz et al. .................. 356/637
5,144,141 A * 9/1992 Rougeot et al. ............... 250/369
5,453,623 A * 9/1995 Wong et al. .............. 250/363.03
5,614,721 A * 3/1997 Pandelisev .................... 250/368
6,448,559 B1 * 9/2002 Saoudi et al. ................ 250/367
6,858,912 B2 2/2005 Marshall et al.
7,060,983 B2 * 6/2006 Tumer ...................... 250/370.09
7,132,664 B1 * 11/2006 Crosetto ....................... 250/367
7,217,928 B2 * 5/2007 Crosetto ....................... 250/366
7,375,341 B1 * 5/2008 Nagarkar et al. ........ 250/370.11
7,403,589 B1 * 7/2008 Short et al. ...................... 378/19
7,635,848 B2 * 12/2009 Nelson ..................... 250/370.11
7,723,694 B2 * 5/2010 Frach et al. ............. 250/370.11

(Continued)

FOREIGN PATENT DOCUMENTS

EP 0311503 A1 4/1989
EP 534683 A2 * 3/1993
JP 04273087 A 9/1992
JP 06109855 A 4/1994
WO 2006111883 A2 10/2006

OTHER PUBLICATIONS

Nicoleta Dinu, The Measurement of the SiPM photon detection efficiency at ITC-irst, Oct. 2006.*
Allier, C. P., et al.; Readout of a LaCl3(CE3+) scintillation crystal with a large area avalanche photodiode; 2002; Nuclear Instruments and Methods in Physics Research; A485:547-550.

*Primary Examiner* — David Porta
*Assistant Examiner* — Taeho Jo

(57) ABSTRACT

A family of photodetectors includes at least first and second members. In one embodiment, the family includes members having different pixel sizes. In another, the family includes members having the same pixel size. The detection efficiency of the detectors is optimized to provide a desired energy resolution at one or more energies of interest.

19 Claims, 6 Drawing Sheets

U.S. PATENT DOCUMENTS

2002/0148967 A1 10/2002 Iwanczyk et al.
2003/0178570 A1 * 9/2003 Tsunota et al. .......... 250/370.11
2004/0159792 A1 * 8/2004 Andreaco et al. ........ 250/363.03
2004/0164249 A1 * 8/2004 Crosetto ....................... 250/367
2005/0104000 A1 * 5/2005 Kindem et al. ........... 250/361 R
2005/0123094 A1 6/2005 Suzuki
2005/0211906 A1 * 9/2005 Tonami et al. ................ 250/367
2007/0085088 A1 * 4/2007 Sekine et al. ................... 257/80
2007/0181814 A1 * 8/2007 Crosetto ....................... 250/368

* cited by examiner

SILICON PHOTOMULTIPLIER ENERGY RESOLUTION

CROSS REFERENCE TO RELATED APPLICATIONS

This application claims the benefit of U.S. provisional application Ser. No. 60/969,709 filed Sep. 4, 2007, which is incorporated herein by reference.

The following relates to photodiodes, and especially to arrays of Geiger-mode avalanche photodiodes. It finds particular application to detectors used in positron emission tomography (PET) and single photon emission computed tomography (SPECT) systems, optical imaging devices, spectrometers, and other applications in which arrays of photosensors are deployed.

Various applications in the medical and other domains rely on the detection of low level light pulses. PET systems, for example, include radiation sensitive detectors that detect gamma photons indicative of positron decays occurring in an examination region. The detectors include a scintillator that generates bursts of lower energy photons (typically in or near the visible light range) in response to received 511 keV gammas, with each burst typically including on the order of several hundreds to thousands of photons spread over a time period on the order of a few tens to hundreds of nanoseconds (ns). A coincidence detector identifies those gammas that are detected in temporal coincidence. The identified events are in turn used to generate data indicative of the spatial distribution of the decays.

Photomultiplier tubes (PMTs) have conventionally been used to detect the photons produced by the scintillator. However, PMTs are relatively bulky, vacuum tube based devices that are not especially well-suited to applications requiring high spatial resolution. More recently, silicon photomultipliers (SiPMs) have been introduced. SiPMs have included an array of detector pixels, with each pixel including on the order of several thousand avalanche photodiode (APD) cells. The various APD cells are operated in the Geiger mode, with each cell including a quenching circuit. A plurality of SiPMs have also been combined to form an SiPM array. SiPMs can offer a number of advantages, including relatively compact size, good sensitivity, good timing resolution, and good spatial resolution.

Moreover, APDs and their associated readout circuitry can often be fabricated on a common semiconductor substrate. In one readout scheme, the various APD cells have been connected electrically in parallel so as to produce an output signal that is the analog sum of the currents generated by the APD cells of an SiPM. In another, digital readout circuitry has been implemented at the cell level. See, e.g., PCT Patent Publication No. WO2006/111883A2 dated Oct. 26, 2006 and entitled Digital Silicon Photomultiplier for TOF-PET.

The amplitude of the signals produced by the SiPM can provide information indicative of the energy of the detected radiation. In applications such as spectrometry, the ability to measure and identify this energy can provide important information about an object being examined. In other applications such as PET and SPECT, the energy information can be used to identify and/or reject spurious events such as those due to randoms and scatters, thereby tending to improve the quality of image data produced by the system.

Unfortunately, however, SiPMs can be prone to saturation. In a pixelated scintillator detector, for example, the number of scintillation photons produced by a scintillation interaction is approximately proportional to the energy of the detected radiation but is independent of the pixel size. If the product of the number of scintillation photons in a given pulse and the detector's photon detection efficiency (PDE) is significantly less than the number of APD cells of the pixel, the amplitude of the SiPM signal is proportional to the number of photons detected by the SiPM. As the number of photons increases, however, additional photons cause an increasingly smaller rise in the SiPM signal amplitude. This flattening leads to detector saturation and a concomitant degradation in energy resolution.

While increasing the number of APD cells in the pixel can reduce the effects of saturation, doing so also tends to reduce the area efficiency of the SiPM. This in turn reduces the detector PDE. Thus, for a given pixel size, the number and size of the APD cells in the pixel are typically optimized according to the number of photons that need to be detected (i.e., according to the light yield of the scintillator and the energy of the detected radiation).

As a consequence, it has been necessary to develop SiPMs that are optimized for a given application. Again to the example of a PET system, a whole body scanner might require a pixel size on the order of 16 square millimeters ($mm^2$), a head scanner might require a pixel size on the order of 4 $mm^2$, an animal scanner might require a pixel size of 1 $mm^2$, and so on. Thus, development of a whole body scanner would necessitate the development, optimization, and fabrication of a first SiPM, development of a head scanner would necessitate the development, optimization, and fabrication of a second SiPM, and so on. As will be appreciated, these activities can lead to a significant in development and fabrication cost.

Aspects of the present application address these matters and others.

According to a first aspect, a radiation detector includes a first scintillator pixel, a second scintillator pixel, and a first detector including a plurality of avalanche photodiodes. The first detector produces an output that varies as a function of the energy of radiation received by the first scintillator pixel and provides a maximum energy resolution at a first energy. The radiation detector also includes a second detector including a plurality of avalanche photodiodes. The second detector produces an output that varies as a function of the energy of radiation received by the second scintillator pixel and provides a maximum energy resolution at a second energy.

According to another aspect, a method includes using a first detector that includes a plurality of avalanche photodiodes to produce an output that varies as a function of the energy of radiation received by a first scintillator. The first detector has a maximum energy resolution at a first energy. The method also includes using a second detector that includes a plurality of avalanche photodiodes to produce an output that varies as a function of the energy of radiation received by a second scintillator. The second detector has a maximum energy resolution at a second energy.

According to another aspect, a method includes determining a number of photons produced by a scintillator material in a scintillation interaction with radiation having a first energy, selecting an avalanche photodetector cell design that is characterized by a cell area for use in first and second pixelated radiation detectors, and determining a first scintillation photon detection efficiency at which a pixel of the first radiation detector produces a first energy resolution at the first energy.

According to another aspect, a family of radiation detectors is provided. A first member of the family includes a first detector that includes a first detector pixel having a first pixel area. The first pixel includes a first number of avalanche photodiode cells having a first cell area, and the first pixel is characterized by a first scintillation photon detection efficiency. A second member of the family includes a second detector that includes a second detector pixel having a second pixel area that is greater than the first pixel area. The second pixel includes a second number of avalanche photodiode cells having the first cell area, the second number is greater than the first number, and the second pixel is characterized by a second scintillation photon detection efficiency that is greater than the first scintillation photon detection efficiency.

According to another aspect, a radiation detector includes a scintillator and an avalanche photodiode array that detects scintillation photons from the scintillator. The detector includes an electrically adjustable scintillation photon detection efficiency.

According to another aspect, a method includes using a detector that includes a scintillator and an avalanche photodiode array to detect radiation, varying an energy resolution of the detector, and repeating the step of using.

Still further aspects of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

In an imaging or other system that includes a pixelated scintillator detector, the detector spatial resolution is a function of the scintillator pixel size. Thus, a detector having relatively smaller pixels will generally have a better spatial resolution than a comparable detector having larger pixels.

As noted above, the number of scintillation photons produced by a scintillation interaction depends on the characteristics of the scintillator material and the energy of the detected radiation, but is independent of the pixel size. If the same size APD cells are used in detectors having different pixel sizes, the number of APD cells per pixel will ordinarily vary as a function of the pixel size (e.g., detectors having smaller pixels will have a lower number of APD cells). As a consequence, a detector having smaller pixels will tend to saturate at a lower energy than would a comparable detector having larger pixels.

Figure 1:
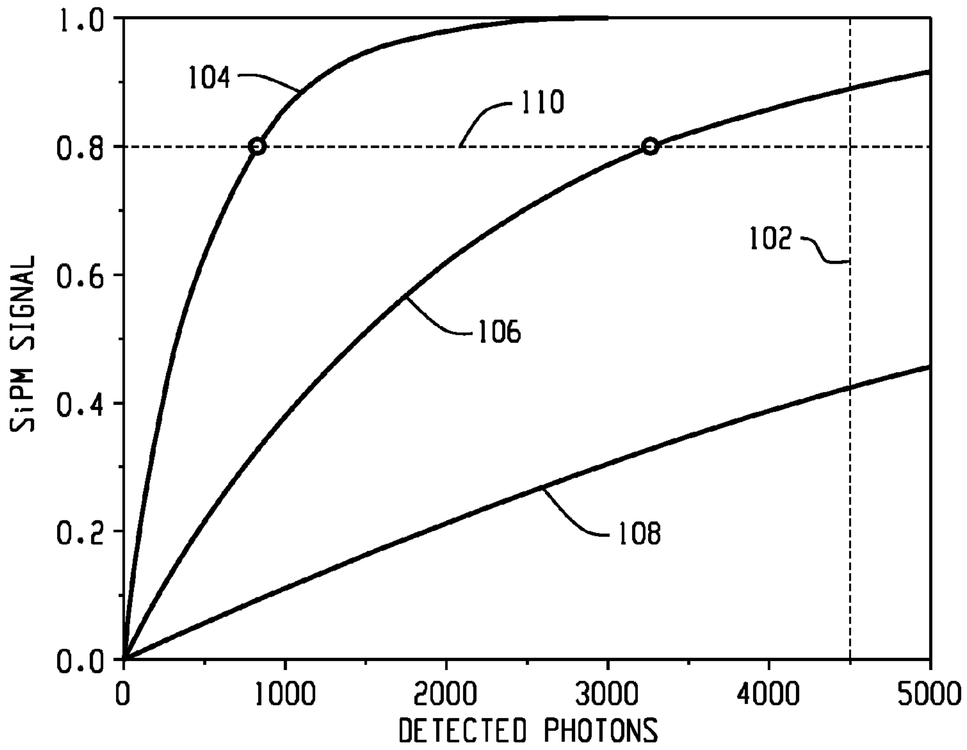
FIG. 1 depicts amplitudes of SiPM signals as a function of detected photons.

Such a situation is illustrated in FIG. 1, in which the abscissa represents the number of photons detected by an SiPM and the ordinate represents the normalized detector output, where 1.0 is the signal produced by a fully saturated detector. For the purposes of the present discussion, it will be assumed that the detector includes a lutetium yttrium orthosilicate (LYSO) scintillator that produces roughly 15,000 scintillation photons in response to an interaction with a 511 keV gamma photon, of which roughly 50% are incident on the SiPM (i.e., about 7,500 incident photons), and that 60% of the incident scintillation photons could be detected by the SiPM (i.e., the photon detection efficiency of the SiPM is about 60%). Thus, the SiPM would detect approximately 4,500 scintillation photons in response to a 511 keV gamma photon. This is illustrated in FIG. 1 as line 102.

In FIG. 1, curve 104 represents a signal produced by a 1 $mm^2$ detector pixel having 512 APD cells, curve 106 represents a signal produced by a 4 $mm^2$ detector pixel having 2,048 APD cells, and curve 108 represents a signal produced by a 16 $mm^2$ detector pixel having 8,192 APD cells. As can be seen, the 1 $mm^2$ pixel would be fully saturated by a 511 keV gamma and would thus have no energy resolution for radiation in the vicinity of (and indeed substantially below) 511 keV. The 2 $mm^2$ pixel would be significantly saturated and would thus have poor energy resolution, while the 4 $mm^2$ pixel would be substantially unsaturated (or stated conversely, only moderately saturated) and would therefore have a reasonable energy resolution.

Figure 2:
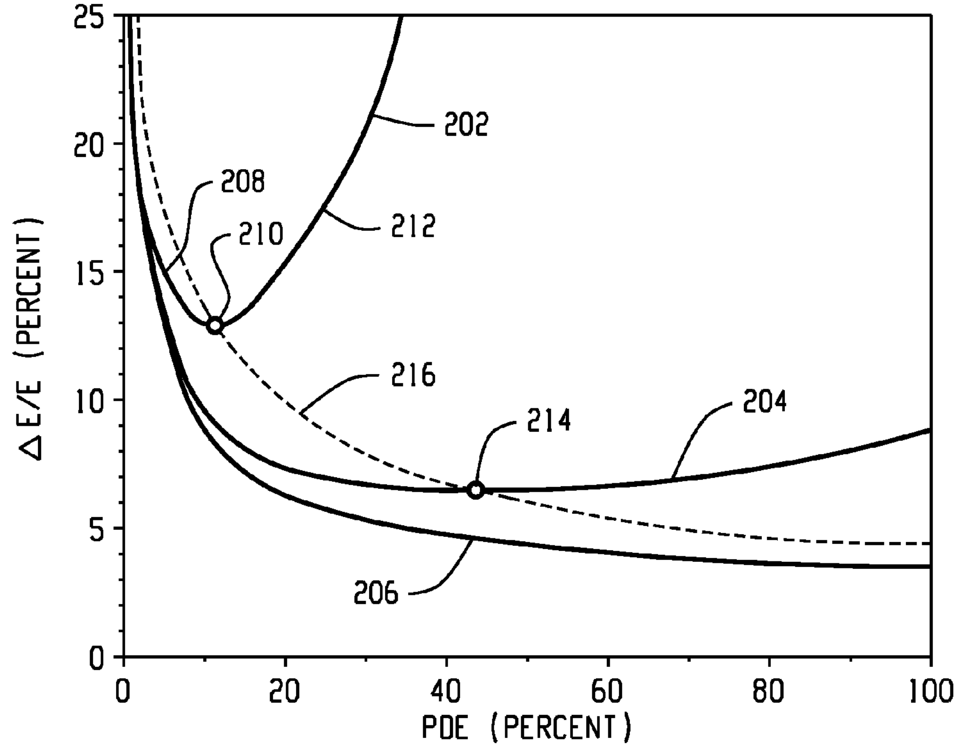
FIG. 2 depicts energy resolutions of SiPMs as a function of the PDE of the SiPMs.

Viewed from another perspective, the energy resolution at a given energy is, for a given detector configuration, a function of the number of photons detected by the SiPM. This in turn implies that the energy resolution depends on the efficiency with which the incident photons are detected. This is illustrated in FIG. 2, in which the abscissa represents the photon detection efficiency (PDE) of the SiPM in percent, while the ordinate represents the energy resolution $\Delta E/E$ at an energy E. For the purpose of the present example, it will be assumed that that a scintillation interaction with a photon of energy E produces about 7,500 scintillation photons.

In FIG. 2, curve 202 represents the energy resolution $\Delta E/E$ of a 1 $mm^2$ detector pixel having M=512 APD cells, curve 204 represents the energy resolution $\Delta E/E$ of a 4 $mm^2$ detector pixel having 4M=2,048 APD cells, and curve 206 represents the energy resolution $\Delta E/E$ of a 16 $mm^2$ detector pixel having 16M=8,192 APD cells. As can best be seen in relation to the curve 202, the energy resolution $\Delta E/E$ for a given pixel configuration includes a first region 208 in which the curve 202 is characterized by a negative slope, a minimum 210, and a second region 212 in which the curve 202 is characterized by a positive slope.

In the first region 208, which corresponds to a region relatively low on the saturation curve 104 (see FIG. 1), the energy resolution is limited primarily by photon statistics and is thus photon count limited. Hence, the energy resolution improves as PDE increases. In the second region 212, which corresponds to a region relatively high on the saturation curve 104 (see FIG. 1), the energy resolution is limited primarily by the saturation of the detector. Hence the energy resolution worsens as PDE increases. In this example, the minimum 210 is located in a region where the SiPM has a PDE of about 10.5%. Hence, the maximum or best energy resolution at the energy E occurs in a region where the SiPM detects roughly 790 of the 7,500 incident scintillation photons. Stated another way, a PDE of greater or less than about 10.5% produces a poorer than the maximum energy resolution.

Continuing with FIG. 2, curves 204 and 206 are similar. Curve 204, which again depicts a 4 $mm^2$ pixel that includes 2,048 APD cells, includes a minimum 214 located at a PDE of about 42%. Hence, the maximum energy resolution at the energy E occurs at a region where the SiPM detects roughly 3,160 of the 7,500 incident scintillation photons. Because the 16 $mm^2$, 8,192 APD cell pixel operates well below saturation, the energy resolution continues to improve as the PDE approaches 100%, as is illustrated by curve 206. Stated another way, the maximum energy resolution would occur at a PDE greater than 100%. It will also be noted that that curves 202, 204, 206 become relatively narrower as the pixel size decreases, and the maximum energy resolution worsens.

While curves 202, 204, 206 depict 1 $mm^2$, 4 $mm^2$, and 16 $mm^2$ pixel sizes, the possible pixel sizes are not so limited.

Curve 216 depicts the relationship between the maximum energy resolution at the energy E and the PDE for various pixel sizes, it again being assumed that the APD cell size remains unchanged so that the number of APD cells per pixel increases with increasing pixel area. As can be seen, for a relatively smaller pixel, the optimum energy resolution at the energy E is achieved at a PDE lower than that of a larger pixel. Stated another way, the PDE that produces a best or maximum energy resolution in the vicinity of a given energy E is a direct function of the pixel size.

The maximum energy resolution curve 216 can also be mapped to FIG. 1. Doing so reveals that, for a given APD cell size, the maximum energy resolution in the vicinity of the energy E is achieved when the number of photons detected by the SiPM is such that the SiPM produces an output that is about 79.7% of its saturated value. As illustrated by horizontal line 110 of FIG. 1, this ratio is independent of the pixel size. Stated another way, the maximum energy resolution occurs when the relation $$(1-PDE*n/(2*m))*\exp(PDE*n/m)=1 \quad \text{Equation 1}$$

is satisfied, where PDE*n is the number of detected photons and m is the number of APD cells. Solved numerically, the optimum energy resolution thus occurs when:

$$PDE*n/m=1.5936 \quad \text{Equation 2}$$

Moreover, for a given pixel size and SiPM configuration, the PDE that provides a maximum energy resolution at a given energy varies as an inverse function of the energy. Hence, the PDE that provides the maximum energy resolution decreases as the energy increases. Again, however, the maximum energy resolution in the vicinity of the energy E is achieved when the number of photons detected by the SiPM is such that the SiPM produces an output that is about 79.7% of its saturated value.

Figure 5B:
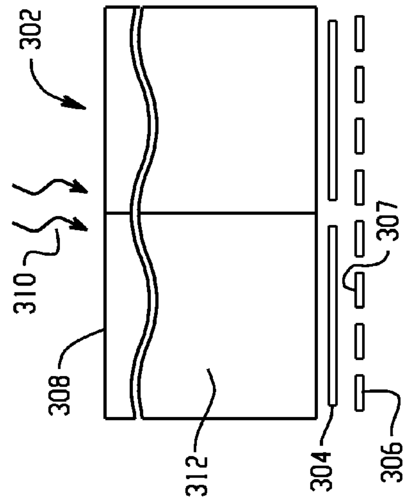
FIGS. 5A and 5B depict respective top and side views of a third detector.
Figure 5A:
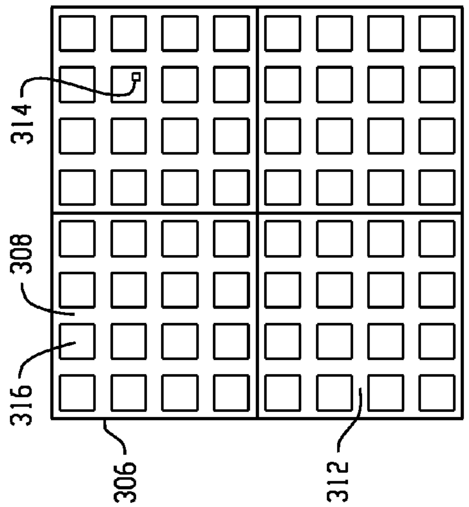
Figure 4B:
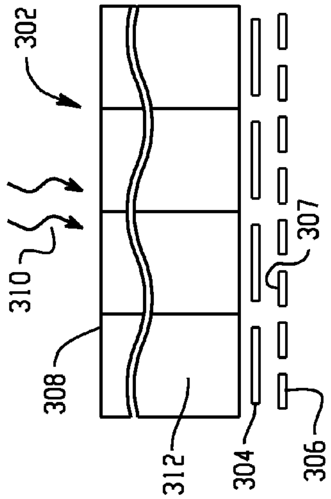
FIGS. 4A and 4B depict respective top and side views of a second detector.
Figure 4A:
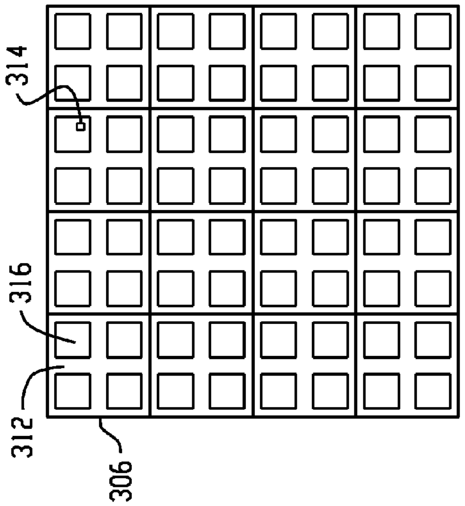

The foregoing relationships can be exploited in various ways. One example will now be described with reference to FIGS. 3A and 3B, 4A and 4B, and 5A and 5B, which depict respective first, second, and third detector configurations. As illustrated, the detectors include a pixelated scintillator 302, optical couplers 304, and one or more SiPMs 306. Note that the optical couplers 304 are omitted from FIGS. 3A, 4A and 5A for clarity of illustration.

The scintillator 302, which includes a radiation receiving face 308, produces scintillation photons in response to radiation 310 from an object under examination. The scintillators 302 also include a plurality of scintillator pixels 312. To minimize optical cross-talk, the various pixels are typically separated by a material that is optically opaque or otherwise relatively non-optically transmissive at the wavelength(s) of the scintillation photons. As noted above, the wavelength of the photons produced in a scintillation interaction depends on the characteristics of the scintillator. For a given scintillator material, however, the number of photons is ordinarily proportional to the energy of the detected radiation.

The SiPMs 306 are organized in a plurality of SiPM pixels, the size and spacing of which correspond to those of the scintillator pixels 312. As illustrated, the number of SiPM pixels corresponds to the number of scintillator pixels 312 in a one to one relationship. It should be noted, however, that the scintillator pixels 312 and SiPM pixels may have different sizes and/or spacings. Moreover, such a one to one correspondence is not required. By way of one example, the SiPM pixels may have a dimension that is larger (or smaller) than a corresponding dimension of the scintillator pixel 312 (e.g., the width of three SiPM pixels may match the width of two scintillator pixels). Each SiPM pixel includes a plurality of APD cells 314 (only one such cell being illustrated in FIGS. 3A, 4A and 5A for clarity of illustration) that detect photons received at a photon receiving face 307. Each APD cell 314 includes an APD operated in the Geiger mode and a quenching/charging circuit. As will be explained in further detail below, the configuration and sizes of the APD cells 314 across the first, second and third detector configurations are substantially the same. Thus, the number of APD cells 314 in a given pixel is a function of the pixel area. Moreover, the APD cells 314 in a pixel may be organized into one or more detector cells or modules 316, with the number of detector cells 316 in a pixel again scaling as a function of the pixel area. Note that suitable readout circuitry may be provided at the APD cell 314, detector cell 316, and/or pixel levels.

Data from each pixel is preferably collected to produce an output that is indicative of the total number of photons detected by the pixel in response to a scintillation burst (or otherwise in a desired reading period) and hence the energy of the radiation detected by the pixel. In the case of a PET or other system that measures the arrival times of the detected radiation, a photon triggering network may be connected to a suitable time to digital converter which produces an output indicative of the arrival time, for example with respect to a common system clock.

The photon receiving faces 307 of the various SiPM pixels are in operative optical communication with their corresponding scintillator pixels via the optical couplers 304. The optical couplers 304 and/or the SiPMs 306 are configured so that the PDE of scintillation photons produced in response to radiation having an energy of interest produces an energy resolution at the energy of interest which is at or near the maximum. Note that, while the optical couplers 304 are illustrated as being distinct from the scintillator 302 and SiPMs 306, some or all of the optical couplers 304 may be integral to one or both of the scintillator 302 and SiPMs 306.

Figure 3B:
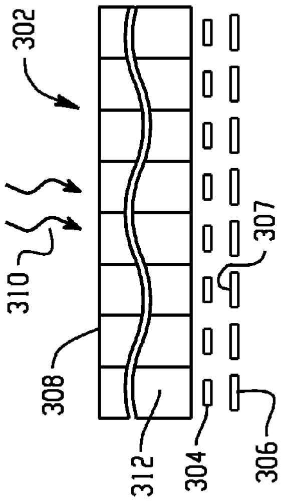
FIGS. 3A and 3B depict respective top and side views of a first detector.
Figure 3A:
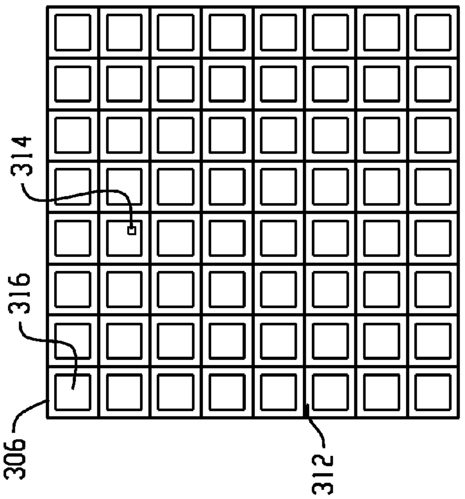

With specific reference to the example of FIGS. 3A and 3B, the scintillator pixels 312 are characterized by an area A, and the corresponding SiPM pixels include M substantially identical APD cells 314 organized in N substantially identical detector cells 316. With specific reference to the example of FIGS. 4A and 4B, the scintillator pixels 312 are characterized by an area 4A, and the SiPM pixel includes 4M substantially identical APD cells 314 organized in 4N substantially identical detector cells 316. With specific reference to the example of FIGS. 5A and 5B, the scintillator pixels 312 are characterized by an area 16A, and the SiPM pixel 314 includes 16M substantially identical APD cells 314 organized in 16N substantially identical detector cells 316.

For each pixel size, the optical couplers 304 and/or the SiPMs 306 are configured to provide a maximum or other desired energy resolution at an energy of interest. For example, if the first detector configuration has a PDE of about P %, the second detector configuration may have a PDE of about 4P %, and the third detector configuration may have a PDE of about 16P %.

Thus, the same APD cell 314 and/or detector cell 316 design may be used in applications that require different pixel sizes, while still maintaining an energy resolution capability at an energy of interest. Similarly, the same cell 314, 316 designs may be used in applications that require the same or similar pixel sizes but which require the energy resolution to be optimized at different energies of interest. Such an approach reduces the need to develop and optimize APD cell 314 and/or detector cell 316 designs for a number of different pixel sizes or energies of interest. The cells 314, 316, and indeed the SiPMs 306 themselves, may thus be viewed as common modules or building blocks that are assembled as necessary to suit the requirements of a desired application.

Various techniques may be used to vary the detector PDE, either alone or in combination. In one such example, the system includes a variable voltage or bias supply that varies a reverse bias voltage applied to one or more the APDs. Note that some or all of the supply may be fabricated on the same substrate as the APDs; some of all of the supply may also be fabricated on a different substrate. Such an arrangement may be used, for example, to decrease the reverse bias voltage in those applications that require a smaller pixel size or energy resolution at a relatively higher energy (or vice versa). Preferably, however, the APDs remain biased in the Geiger mode. Note that the adjustment may also be performed at the APD cell 314, detector cell 316, pixel, or SiPM levels, for example to compensate for component-to-component variations in designs where the PDE is already close to optimum.

As illustrated in FIGS. 6A-6I, the PDE may also be varied by varying the percentage of scintillation photons that reach the APDs. Note again that PDE may be varied on a pixel-wise or other basis, for example to account for component-to-component variations between pixels. In another implementation, the PDE may be varied so that different pixels or groups of pixels have different PDEs (e.g., a first group of pixels has a first PDE, a second group of pixels has a second PDE, and so on). Such an implementation is particularly useful in spectrometry and other applications in which it is desirable to provide outputs indicative of radiation received at a plurality of different energies.

Figure 6E:
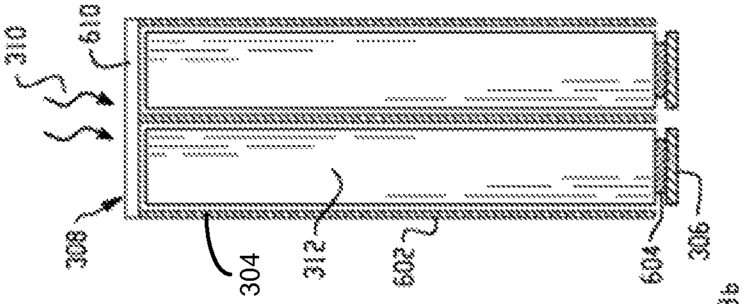
FIGS. 6A-6I depict configurations of an optical coupler.
Figure 6D:
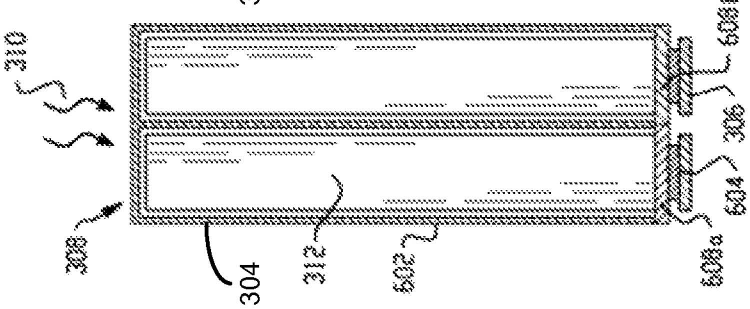
Figure 6C:
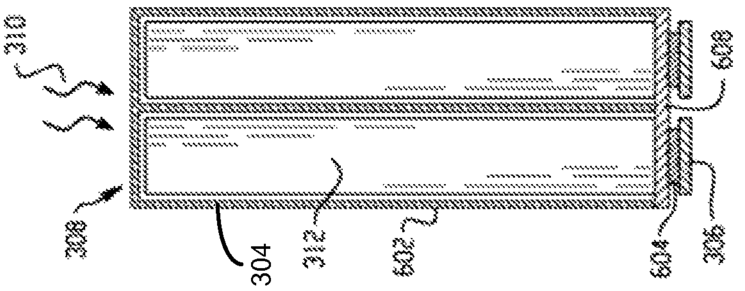
Figure 6B:
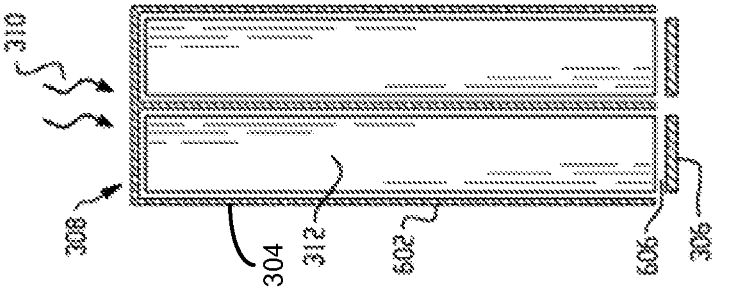
Figure 6A:
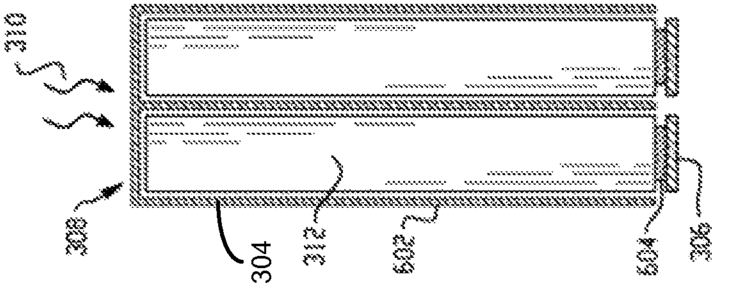

FIG. 6A depicts an arrangement in which the optical couplers 304 include a material 602 that is reflective of the scintillation photons and an optical coupling medium or material 604 disposed between the scintillator pixel 312 and the SiPM 306. As illustrated in FIG. 6A, the reflective material 602 surrounds the scintillator pixel on five (5) sides. The coupling medium 604, which may include by way of example but not limitation a suitable optical adhesive, grease, or oil, silicon pads, or the like, is located on the sixth side. Alternatively or additionally, the coupling medium 604 may include a wavelength shifter such as a wavelength shifting material or optical fiber that shifts the wavelength of the scintillation photons to a wavelength that more closely matches the sensitive wavelength of the SiPM. For purposes of the present explanation, it will be assumed that, for a given scintillator pixel 312—SiPM 306 arrangement, the optical coupler 304 arrangement illustrated in FIG. 6A provides a maximum PDE relative to those of FIGS. 6B-6I.

To reduce the optical coupling between the scintillator pixel 312 and the SiPM 306 and hence the effective PDE, some or all of the optical coupling material 604 may be omitted. FIG. 6B illustrates a situation in which the material 604 is omitted entirely so as to introduce an air gap 606 between the scintillator pixels 312 and the corresponding SiPMs 306. Alternatively or additionally, the optical coupling material 604 may be colored or otherwise rendered relatively more opaque to the scintillation photons. As still another alternative, the optical coupling medium 604 may include a wavelength shifter that shifts the wavelength of the scintillation photons to a wavelength or wavelength range at which the SiPM is relatively less sensitive.

As illustrated in FIG. 6C an optical filter 608 or other light absorbing material may be placed between the scintillator pixel 312 and the SiPM 306. Examples of suitable filters include a coating applied to one or both of the scintillator pixel 312 or the SiPM 306, a layer of a filter material, a colored filter, or the like. As illustrated in FIG. 6D, the opacity or other optical characteristics of the filters 608*a*, 608*b* may be adjustable on a pixel-wise or other basis during operation of, or otherwise following the assembly of, the SiPM. In one such implementation, the filters 608*a*, 608*b* are electrically adjustable, for example via a liquid crystal device.

Figure 6F:
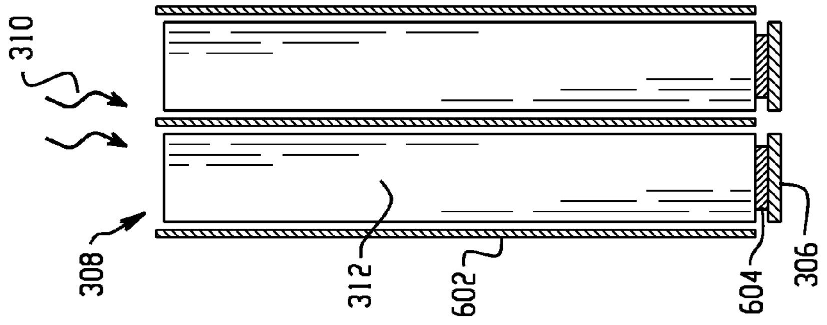

As illustrated in FIG. 6E, adjustable reflectors 610 that reflect the scintillation photons may be provided at the radiation receiving face 308 of the scintillator. Note that the reflectors 610 may be adjustable on a pixel-wise or other basis. Again, the reflectors 610 may be electrically or otherwise adjustable during the operation or otherwise following the assembly of the device. As illustrated at FIG. 6F, the reflectors 602 and/or 610 may be omitted from the radiation receiving face 610. Such an implementation results in an approximately 50% reduction in PDE relative to the configuration of FIG. 6A.

Figure 6G:
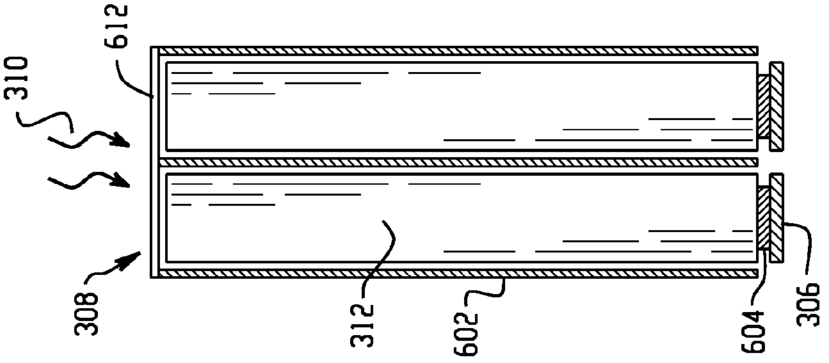
Figure 6H:
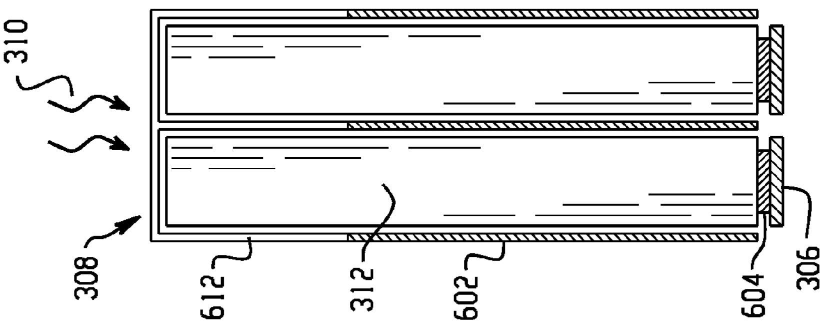
Figure 6I:
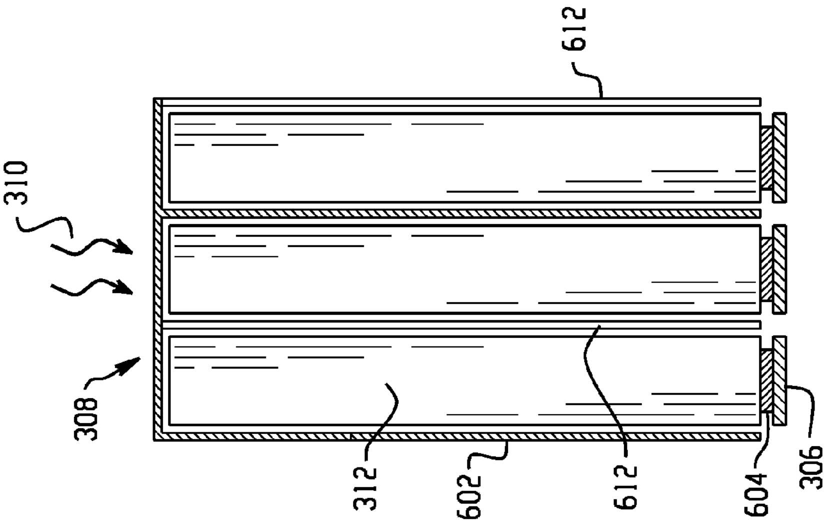

The optical coupling may also be varied by varying the optical characteristics of the reflector 602, for example by increasing or reducing its reflectivity. Moreover, some or all of the reflector 602 may be omitted and replaced with a light absorbing medium 612. In one such implementation, the medium is a blackened coating or material layer. As illustrated in FIGS. 6G, 6H, and 6I, for example, the light absorbing material may be applied to all or a portion of the radiation receiving 308 or side faces of the scintillator pixel 312. Note that, as illustrated in FIG. 6I, every other reflector 602 may be replaced either partially or completely with the light absorbing medium 612.

The optical coupling and hence the PDE may also be varied by varying the characteristics of the scintillator material. Similarly, the number of photons produced in response to a scintillation interaction may also be varied by varying the characteristics of the scintillator material. In view of currently available scintillator materials and fabrication technologies, however, such approaches may be relatively less attractive than those described above in relation to FIG. 6.

Figure 7:
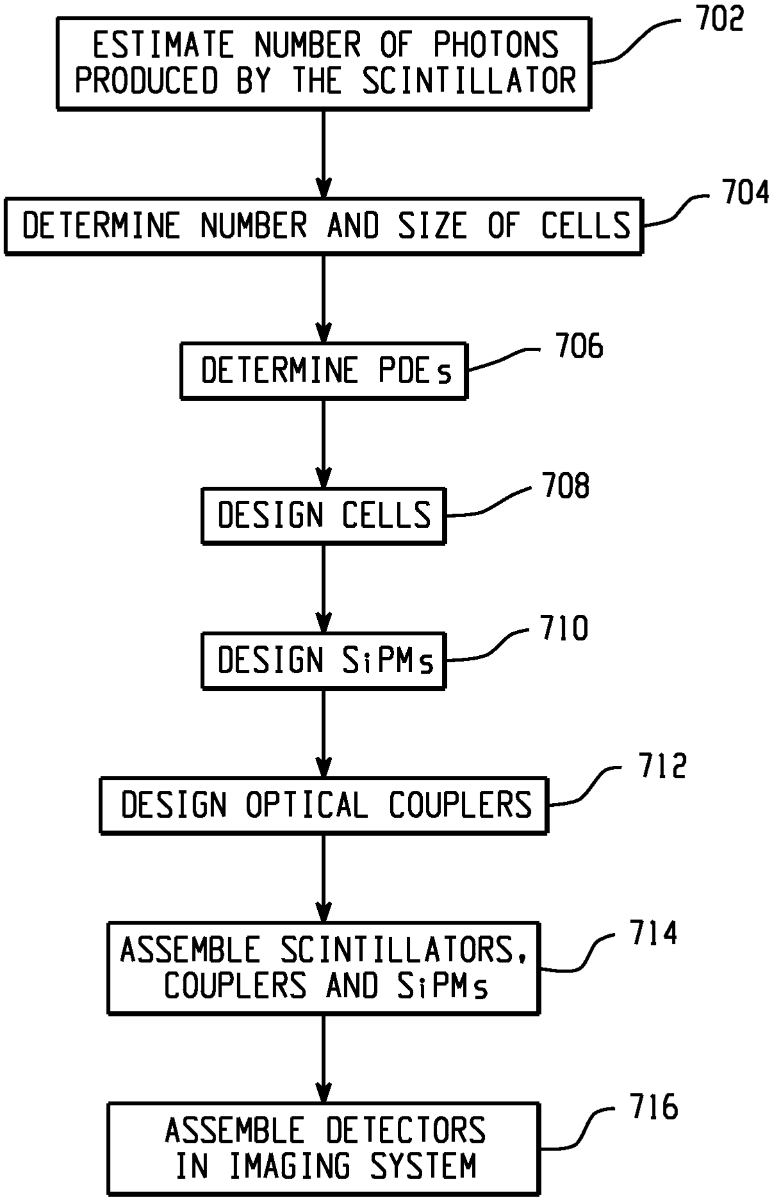
FIG. 7 depicts a method.

Turning now to FIG. 7, a method of producing a radiation detector will be described. The method will be described in relation to first and second examples. The first example includes a family of detectors for use in a first clinical whole body PET scanner having a relatively large field of view, a second clinical neurological (i.e., head) PET scanner having an intermediate size field of view, and a third pre-clinical animal scanner having a relatively small field of view. The second example includes a family of detectors for use in a first detection system that requires a maximum or other desired energy resolution at a first energy and in a second detection system that requires a maximum or other desired energy resolution at a second energy.

At 702, the number of photons produced by a scintillator at one or more energies of interest is estimated. As noted above, in the case of a pixelated scintillator detector, the number of photons ordinarily depends on the selected scintillator and the energy of interest. For the purposes of the estimate, it is assumed that the optical coupling between the scintillator and SiPM pixels is close to a maximally achievable value.

At 704, the number and size of the desired APD cells 314 (and particularly the size of the APD of the cells) and detector cells 316 are determined. As noted above, the number and size of the cells 314, 316 is typically a function of the selected pixel size(s). Note that it may be desirable to optimize the APD cell 314 design for use in the detector having a larger pixel size. For example, it may be desirable to select the number and size of the APD cells 314 so as to maximize the SiPM photon detection efficiency at the largest pixel size, especially where the maximum energy resolution would be achieved at a PDE greater than 100%. Moreover, improving SiPM photon detection efficiency tends to improve overall detector performance and, as noted above, the energy resolution of relatively larger pixels is in any case relatively insensitive to PDE. The number of APD cells 314 and detector cells 316 are scaled according to the selected pixel sizes. Note that, depending on the selected sizes and geometries, the scaling may deviate somewhat from the ideal.

For the purposes of the first example, it will be assumed that the whole body PET scanner has a 4 mm×4 mm pixel area, the neurological scanner has a 2 mm×2 mm pixel area, and the pre-clinical scanner has a 1 mm×1 mm pixel area. Thus, the number and size of the APD cells 314 would ordinarily be selected to maximize the SiPM photon detection efficiency for the 4 mm×4 mm pixel size. Thus, each SiPM pixel of the whole body system detector might include about 8,192 APD cells 314, while the SiPM pixels for the neurological and pre-clinical systems would have about 2,048 and 512 APD cells 314, respectively. Consideration of the pixel areas and modularity reveals that a detector cell 316 having an area of about 1 mm×1 mm and 512 APD cells 314 may be employed in the pre-clinical system detector, while four (4) and sixteen (16) such detector cells 316 may be employed in the neurological and pre-clinical systems, respectively.

At 706, the PDEs that provide the maximum or other desired energy resolution at the energies and/or pixel sizes of interest are determined. In some applications, it may be desirable to deviate from a PDE that provides the desired energy resolution, for example in applications where higher overall photon detection efficiency is relatively more important than improved energy resolution.

For the purposes of the first example, the PDEs that provide the maximum energy resolution for the 4 mm×4 mm, 2 mm×2 mm, and 1 mm×1 mm pixel sizes at about 511 keV are determined. Note that the PDEs are inversely related to pixel area. In the example illustrated in FIG. 2, maximum performance would be achieved if the PDE of the 4 mm×4 mm detector is as high as reasonably possible. As the energy of the 2 mm×2 mm detector is relatively insensitive to changes in PDE, optimum performance may be achieved if the PDE is somewhat higher than the value that provides an optimum energy resolution.

For the purposes of the second example, the selected number of APD cells 314 and the PDE are relatively closely related. While increasing the number of APD cells 314 tends to improve the energy resolution, doing so tends to decrease the detector efficiency. Hence, the number of APD cells 314 and the PDE are selected to provide a desired energy resolution at the lower energy, which energy resolution may be less than that which is otherwise achievable. Optimum performance is ordinarily achieved if, at the lower energy, the number of APD cells 314 is selected to provide a maximum energy resolution at a maximum reasonably achievable PDE. The PDE that provides a maximum energy resolution at the higher energy is selected based on the number of APD cells 314. Note that the PDEs are a direct function of the energy.

At 708, the APD cells 314 and detector cells 316 are designed.

For the purposes of the first example, a detector cell 316 has an area of about 1 $mm^2$ and 512 substantially identical APD cells 314.

At 710, the detector cell 316 design is used in the design of the requisite SiPM(s).

In the first example, the SiPM designed for use in the whole body scanner would include pixels having sixteen (16) detector cells 316, the SiPM designed for use with the neurological scanner would include pixels having four (4) detector cells 316, while the SiPM designed for use with the pre-clinical scanner would include pixels having one (1) detector cell 216. As will be appreciated, such an approach tends to simplify the design of the various SiPMs.

For the purpose of the second example, the same SiPM would ordinarily be used in both systems.

At 712, the couplers that provide the desired PDE(s) are designed.

For the purposes of the first example, a relatively efficient coupler 304 design may be selected for use in the detector to be used in the whole body scanner, while relatively less efficient designs are selected for the detectors to be used in the neurological and pre-clinical scanners. The latter may be accomplished by deliberately degrading the efficiency of the relatively more efficient coupler design, for example by using one of the techniques described above in relation to FIG. 6.

For the purposes of the second example, a relatively efficient coupler design may be selected for use in the detector to be used in the lower energy system, while a relatively less efficient design is selected for the detector to be used in the higher energy system. Again, the latter may be accomplished by deliberately degrading the efficiency of the more efficient coupler design.

At 714, the scintillators, optical couplers, and SiPMs are assembled.

In the first example, three versions of the detector are contemplated and may be assembled as needed.

In the second example, two versions of the detector are contemplated and may be assembled as needed.

At 716, the detectors are installed as part of an imaging, spectroscopy or other examination system.

To the first example, the detectors having 4 mm×4 mm pixels would be installed in the whole body scanner, detectors having 2 mm×2 mm pixels would be installed in the neurological scanner, and detector having 1 mm×1 mm pixels would be installed in the pre-clinical scanner.

To the second example, the detector versions would likewise be installed in the corresponding examination systems.

It will be appreciated that the foregoing design and design selection process may be somewhat iterative in nature. The order in which the various steps are performed may also be varied.

Figure 8:
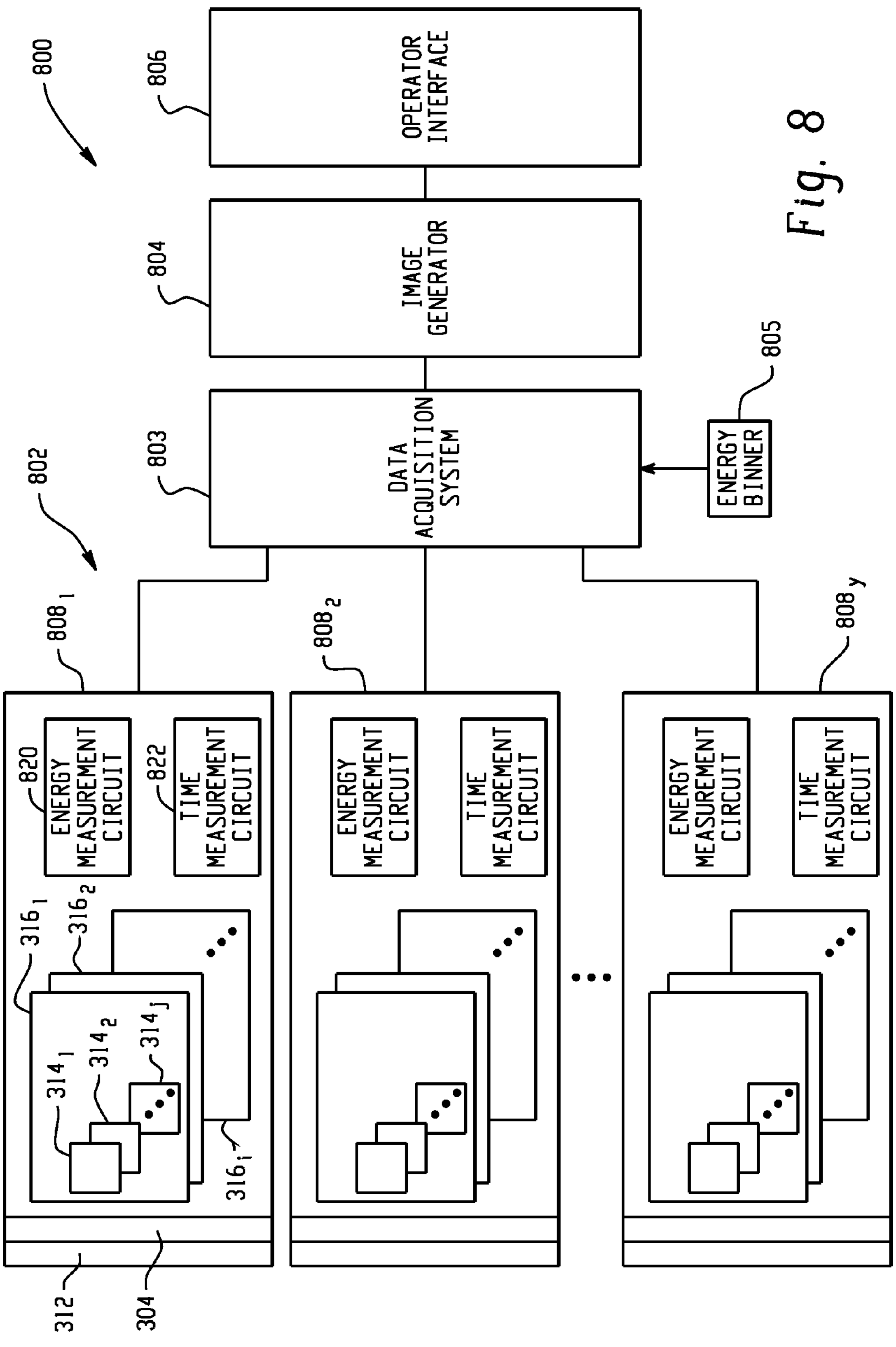
FIG. 8 depicts an examination system.

Turning now to FIG. 8, an examination system 800 includes a pixelated radiation sensitive detector 802, a data acquisition system 803, an image generator 804, and an operator interface 806.

The detector 802 includes one or more pixels $\mathbf{808}_{1\text{-}y}$ that produce output data indicative of the energy, arrival times, locations, and/or other characteristics of the radiation received by the detector. In the example case of a PET system, the detector 802 and its pixels 808 are arranged in a generally annular or ring-shaped arrangement about an examination region that includes a suitable object support.

As described above, each pixel 808 includes a scintillator pixel 312, a plurality of APD cells $\mathbf{314}_{1\text{-}i}$, one or more detector cells $\mathbf{316}_{1\text{-}j}$, and an optical coupler 304, with the various pixels being configured to optimize the energy resolution at an energy (or energies) of interest. Also in the illustrated example, the pixels 808 also include an energy measurement circuit 820 and a time measurement circuit 822. The energy measurement circuit 820 presents an output indicative of the energy of detected radiation, for example by producing an analog output signal, a digital count value, or the like. The time measurement circuit 822 presents an output indicative of the arrival time of detected radiation.

In one implementation, the various pixels 808 are fabricated on separate semiconductor substrates. In another, two (2) or more pixels are fabricated on the same semiconductor substrate. As still another variation, some or all of the pixel electrical circuitry (e.g., the energy 820 and/or time 822 measurement circuits) may be fabricated on different semiconductor substrate(s).

Signals from the pixels 808 are received by a data acquisition system 803, which produces data indicative of the detected radiation. The data acquisition system 803 operates in conjunction with an energy binner or filter 805 that bins the signals according to the energy of the detected radiation. In one implementation, an energy bin is centered on or otherwise includes the energy at which the energy resolution of the various pixels 808 is optimized Note that, where the various pixels 808 are optimized at different energies, multiple such bins may be provided.

In the case of a PET scanner, the energy resolution of the pixels 808 may be maximized at about 511 keV and an energy bin may be likewise established in the vicinity of 511 keV to aid in the identification and/or exclusion of those events that are likely to result from scatters, randoms, or the like. As will be appreciated, such an arrangement provides an improved energy measurement relative to implementations in which the energy resolution is sub-optimum at the 511 keV energy of interest.

Again in the example case of a PET system, the data acquisition system 803 uses the filtered data to produce projection data indicative of temporally coincident photons received by the various pixels 808. Where the system includes time of flight capabilities, a time of flight determiner uses relative arrival times of coincident 511 KeV gamma received by the various pixels 808 so as to produce time of flight data. Note that the coincidences and/or relative arrival times may be determined substantially contemporaneously with the detection of the photons. Alternatively, the arrival times of the various photons may be measured, with coincidences identified and/or time or flight information generated in a subsequent operation.

In a spectrometer or other similar system, the energy resolution of a first pixel or group of pixels may be optimized at a first energy, the energy resolution of a second pixel or group of pixels may be optimized at a second energy, and so on. Desired energy bins are established accordingly, with the information being used to produce an output indicative of the radiation detected at the various energies. Where the system includes adjustable optical couplers 304 or APD bias voltages, the energy resolution may be optimized at a first energy, the radiation detected and binned, and the optimization, detection, and binning repeated for different energies as desired. Note that, depending on the requirements of a given examination, the optimization may be performed prior to an examination, one or more times during the course of an examination, or both.

Where the examination system 800 is configured as an imaging system, an image generator 804 uses the data from the acquisition system 804 to produce image(s) or other data indicative of the detected radiation. Again in the example of a PET system, the image generator 804 includes an iterative or other reconstructor that reconstructs the projection data to form volumetric or image space data.

The user interacts with the system 800 via the operator interface 806, for example to control the operation of the system 800, view or otherwise manipulate the data from the data acquisition system 803 or image generator 804, or the like.

Variations are contemplated. For example, the above techniques are not limited to use in optimizing detector energy resolution and may be used in photon counting applications in which it is desirable to accurately count the number of photons received by the detector. Where the SiPM is sensitive to radiation of the energy(ies) to be detected, the scintillator may be omitted. According to such implementations, the coupling between the SiPMs and the environment is adjusted as described above.

Other configurations and scintillator materials are also contemplated. As one example, the detector may include a wavelength shifter such as wavelength shifting material or wavelength shifting optical fibers to shift the wavelength of the scintillation of the scintillation photons to a wavelength that more closely corresponds to the sensitive wavelength range of the SiPM. Where the goal is to degrade PDE, on the other hand, the wavelength shifter may be employed to shift the wavelength of the scintillation photons to a wavelength at which the SiPM is less sensitive. The form factor of the various cells and pixels may be other than square.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A radiation detector comprising:

a first scintillator pixel;

a second scintillator pixel;

a first detector cell of a first silicon photomultiplier pixel including a plurality of avalanche photodiode cells, wherein the first detector cell produces an output that varies as a function of the energy of radiation received by the first scintillator pixel and provides a maximum energy resolution at a first energy;

a second detector cell of a second silicon photomultiplier pixel including a plurality of avalanche photodiode cells, wherein the second detector cell produces an output that varies as a function of the energy of radiation received by the second scintillator pixel and provides a maximum energy resolution at a second energy, wherein the first and second detector cells are not part of a same single detector.

2. The radiation detector of claim 1 wherein the avalanche photodiodes of the first detector are grouped in a plurality of substantially identical detector cells.

3. The radiation detector of claim 2 wherein the first detector includes exactly 4N substantially identical detector cells, wherein n is an integer greater than or equal to one.

4. The radiation detector of claim 1 produced by a process that includes:

identifying the first energy;

configuring the radiation detector so that, in response to radiation received by the first scintillator pixel and having the first energy, the first detector produces an output that is about 80% of its saturated value.

5. The radiation detector of claim 1 wherein the radiation detector includes a coupler that couples the first scintillator pixel and the first detector, and wherein the radiation detector is produced by a process that includes configuring the coupler so as to deliberately degrade the efficiency with which the first detector detects photons from the first scintillator pixel.

6. The radiation detector of claim 1 wherein the radiation detector includes a first pixel size and a coupler that couples the first scintillator pixel and the first detector, and wherein the radiation detector is produced by a process that includes:

selecting an avalanche photodiode cell design from a radiation detector having a second, relatively larger pixel size, wherein the cell design is characterized by a cell area;

configuring the coupler to provide the maximum energy resolution at the first energy.

7. The radiation detector of claim 1 wherein the first scintillator pixel includes a radiation receiving face, the radiation detector includes a reflector that reflects photons produced by the scintillator pixel, and the reflector does not reflect produced photons received at least a portion of the radiation receiving face.

8. The radiation detector of claim 1 wherein the first scintillator pixel includes a radiation receiving face, a face through which photons produced by the scintillator pixel are communicated to the first detector, and a side, the radiation detector includes a reflector that reflects photons produced by the first scintillator pixel, and wherein the reflector does not reflect produced photons received at least a portion of the side.

9. The radiation detector of claim 1 wherein the first scintillator pixel includes a radiation receiving face, a first side, and a second side, and produces photons in response to received radiation, and wherein the first side includes a first relatively photon reflective material and a second side includes a second relatively less photon reflective material.

10. The radiation detector of claim 1 wherein the avalanche photodiodes are biased in the Geiger mode.

11. A method comprising:

using a first detector cell of a first silicon photomultiplier pixel including a plurality of avalanche photodiode cells, to produce an output that varies as a function of the energy of radiation received by a first scintillator, wherein the first detector has a maximum energy resolution at a first energy;

using a second detector cell of a second silicon photomultiplier pixel including a plurality of avalanche photodiode cells to produce an output that varies as a function of the energy of radiation received by a second scintillator, wherein the second detector has a maximum energy resolution at a second energy, wherein the first and second detector cells are not part of a same single detector.

12. The method of claim 11 wherein the output of the first detector is characterized by a saturated value and the method includes producing, in response to detected radiation having the first energy, an output that is about 80% of the saturated value.

13. The method of claim 11 including adjusting a coupler that couples the first detector and the first scintillator to reduce a difference between the first and second energies.

14. The method of claim 11 wherein method includes:

changing the first energy;

repeating the step of using the first detector.

15. The method of claim 11 wherein the first and second energies are different and the method includes:

binning, as a function of the first output, radiation received by the first scintillator in a first energy bin that includes the first energy;

binning, as a function of the second output, radiation received by the second scintillator in a second energy bin that includes the second energy.

16. A family of radiation detectors, wherein members of the family include:

a first detector of a first silicon photomultiplier that includes a first detector pixel having a first pixel area, wherein the first pixel includes a first number of avalanche photodiode cells having a first cell area, and the first pixel is characterized by a first scintillation photon detection efficiency;

a second detector of a second silicon photomultiplier that includes a second detector pixel having a second pixel area that is greater than the first pixel area, wherein the second pixel includes a second number of avalanche photodiode cells having the first cell area, the second number is greater than the first number, and the second pixel is characterized by a second scintillation photon detection efficiency that is greater than the first scintillation photon detection efficiency.

17. The family of claim 16 wherein the second area is N times greater than the first area and the second number of avalanche photodiode cells is approximately N times greater than the first number of avalanche photodiode cells.

18. The family of claim 16 wherein the second area is N times greater than the first area and the second scintillation photon detection efficiency is approximately N times greater than the first scintillation photon detection efficiency.

19. The family of claim 16 wherein the first and second detector pixels each produce an output that is about 80% of their respective saturated values in response to detected radiation having a first energy.

* * * * *